Patented Feb. 21, 1939

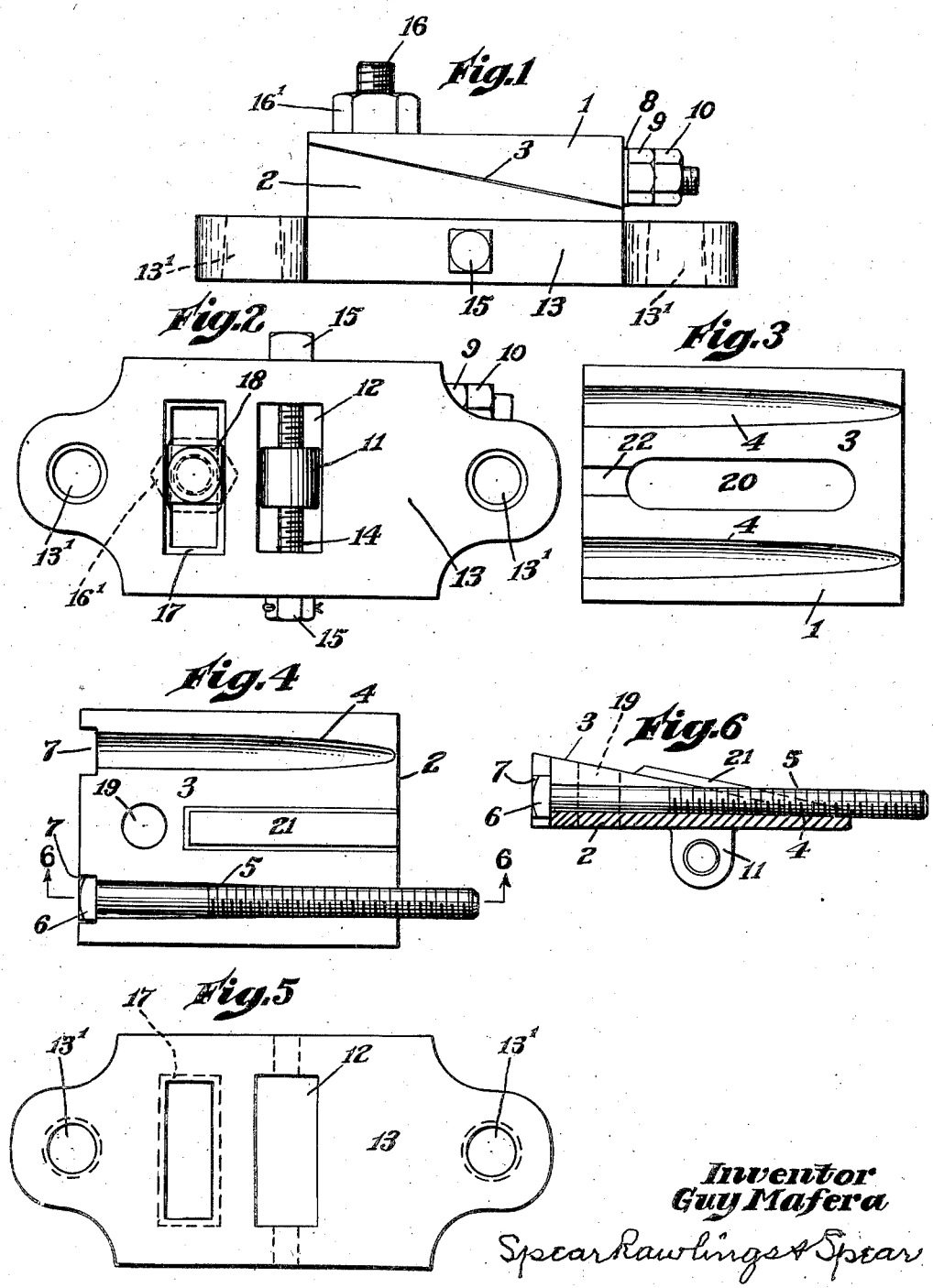

2,147,909

UNITED STATES PATENT OFFICE 2,147,909

ALIGNER

Guy Mafera, Revere, Mass.

Application December 31, 1937, Serial No. 182,686

5 Claims. (Cl. 254—104)

This invention relates to a novel aligner for adjustably supporting, for example, an engine element relative to the engine bed to effect accurate alignment of the engine and propeller shafts, and is an improvement upon the aligner shown in my co-pending application, Serial Number 153,767, filed July 15, 1937.

In accordance with my present invention the aligner comprises a base for permanent attachment to the engine bed. Adjustably mounted on the aligner base is a pair of coacting wedge members for moving the engine on the bed to secure proper alignment of the engine and propeller shafts. The upper wedge member only is adjustable longitudinally of the aligner base but both wedge members are adjustable as a unit laterally of said aligner base.

Extending upwardly from the aligner base through said adjusting wedges and the engine bracket is a bolt provided with a nut. By tightening said nut against the engine bracket the adjustment of the wedges is held, once the engine and propeller shafts have been brought into proper alignment. This bolt is movable laterally in a slot in the aligner base when the wedges are adjusted laterally as a unit but is not affected by the adjustment of the top wedge member longitudinally of the aligner base. Thus my improved aligner provides for both longitudinal and lateral adjustment of the engine on its bed.

In the accompanying drawing and specification, I have illustrated and discussed an embodiment of my invention. In the drawing—

Fig. 1 shows my aligner in elevation.

Fig. 2 is a bottom plan view.

Fig. 3 is a bottom plan view of the upper wedge member.

Fig. 4 is a top plan view of the lower wedge member.

Fig. 5 is a top plan view of the base and

Fig. 6 shows the lower wedge member in cross section as viewed along the lines 6—6 of Fig. 4.

In accordance with my invention, I utilize a pair of wedge members 1 and 2 each of which has an inclined surface 3. The members 1 and 2 are reversed and assembled with the surfaces 3 in mutual contact.

Each of the surfaces 3 is formed with a pair of grooves 4 to establish when the members 1 and 2 are assembled as shown in Fig. 1, a pair of longitudinal apertures in either one of which may be positioned a bolt 5. The head 6 of the bolt 5 bears against the thick end of the lower member 2 and preferably is held against rotation by the countersink 7. I have shown a square washer 8 bearing against the thick end of the member 1, an adjusting nut 9 and a lock nut 10 by which the member 1 may be longitudinally adjusted relative to the member 2. The purpose of the washer 8 is to prevent the adjusting nut 9 from entering the groove 4 as the nut is turned to cause the top wedge to slide longitudinally over the bottom wedge 2, the lower edge of the square washer riding up along the inclined surface of the bottom wedge and holding the nut out of the groove.

The member 2 is formed on its under face with an interiorly threaded projection 11 which enters a transversely elongated recess 12 in the aligner base 13. An adjusting bolt 14 extends transversely through the base 13 and is threaded through the projection 11 and is held against advancement by heads 15 so that by rotation of the bolt 14, the members 1 and 2 are moved as a unit transversely of the aligner base 13, the recess 12 being of sufficient length to permit such transverse movement.

The aligner base 13 is provided with at least two bolt holes 13' through which extend suitable bolts (not shown) for permanently fastening the aligner base to the engine bed.

Extending from the aligner base 13 and through the wedges 1 and 2 and the engine bracket (not shown) is a bolt 16 having at its upper end a nut 16'. After the aligner has been adjusted to secure proper alignment between the engine and propeller shafts, the nut 16' is tightened against the engine bracket to hold such adjustment.

The aligner base 13 is formed with a transverse recess 17 to hold the head 18 of the bolt 16 against rotation but to permit its transverse movement with the members 1 and 2. The bolt 16 extends through a hole 19 in the thick end of the member 2.

In order to permit longitudinal movement of the member 1 relative to the member 2, I form the member 1 with a longitudinal slot 20 intermediate the grooves 4 through which the upper end of the bolt 16 extends.

Preferably, the upper face of the member 2 is formed intermediate the grooves 4 with a longitudinal rib 21 commencing at the thin end and terminating adjacent the bolt hole 19. The surface 3 of the member 1 is formed with a groove 22 extending from its thick end to the slot 20 to cooperate with the rib 21 to prevent undesired lateral movement of the member 1 relative to the member 2.

In using my aligners, I insert one of them under each engine bracket between it and the engine bed and bolt or otherwise fix the aligner base 13 to the engine bed by suitable bolts extending through the bolt holes 13'. By adjusting the wedges 1 and 2 as heretofore described, the engine may be moved either longitudinally or laterally to effect proper alignment of the engine and propeller shafts, and such alignment is held by tightening the nut 16' against the engine bracket.

What I therefore claim and desire to secure by Letters Patent is:

1. An aligner for adjusting a machine element vertically and horizontally to its bed, said aligner including a base for attachment to said supporting bed, and a pair of members having wedge surfaces disposed in mutual contact, adjustable means connecting one of said members to said base to effect movement of said connected member in one direction, adjustable means coacting with each of said members to effect movement of the unconnected member in another direction, and a bolt for attaching said element to said aligner, said base and said members being apertured to receive said bolt, said base aperture being formed to hold said bolt against rotation and to permit its movement with said connected member, the aperture in said unconnected member being formed to permit its movement relative to said bolt.

2. An aligner for adjusting a machine element vertically and horizontally relative to its bed, said aligner including a base for attachment to said supporting bed, and a pair of members having wedge surfaces disposed in mutual contact, adjustable means connecting one of said members to said base to effect movement of said connected member in one direction, means slidably interconnecting said members, adjustable means coacting with each of said members to effect movement of the unconnected member in another direction, and a bolt for attaching said element to said aligner, said base and said members being apertured to receive said bolt, said base aperture being formed to hold said bolt against rotation and to permit its movement with said connected member, said unconnected member being formed to permit its movement relative to said bolt.

3. An aligner for adjusting a machine element relative to its supporting base, said aligner including a base having a transverse recessed slot and being adapted to be secured to said supporting base, a pair of members having wedge surfaces disposed in mutual contact, adjustable means connecting one of said members to said base to effect movement of said member transversely of said base, said connected member having a bolt hole, said unconnected member having a longitudinal slot, a bolt, said bolt extending through said slot and said hole and having its head held against rotation by said slot in said base but movable therein when said connected member is actuated by said adjusting means, and adjustable means coacting with each of said members to effect movement of said unconnected member longitudinally of said base.

4. An aligner for adjusting a machine element relative to its supporting base, said aligner including a base having a transverse recessed slot and being adapted to be secured to said supporting base, a pair of members having wedge surfaces disposed in mutual contact and having a tongue and groove interlock, adjustable means connecting one of said members to said base to effect movement of said member transversely of said base, said connected member having a bolt hole, said unconnected member having a longitudinal slot, a bolt, said bolt extending through said slot and said hole and having its head held against rotation by said slot in said base but movable therein when said connected member is actuated by said adjusting means, and adjustable means coacting with each of said members to effect movement of said unconnected member longitudinally of said base.

5. An aligner for adjusting a machine element relative to its supporting base, comprising an upper member and a lower member, each of said members having wedge surfaces disposed in mutual contacting relation, each of said wedge surfaces having a pair of spaced longitudinal grooves disposed to establish on the assembly of said members, a pair of longitudinal passages through said aligner, adjustable means in one of said passages coacting with the thick end of each member to effect relative movement thereof, said upper member having a slot intermediate said grooves, the thick end of said lower member having a bolt hole, a base to be secured to said supporting base, adjustable means connecting said lower member to said base to effect movement of said member at right angles to the movement effected by said first-named adjustable means, and a bolt for attachment to said element, said bolt extending through said aperture and said slot, said base having a recessed slot to hold the head of said nut against rotation and to permit its movement with said lower member.

GUY MAFERA.